US007017360B2

(12) United States Patent
Kotwicki et al.

(10) Patent No.: US 7,017,360 B2
(45) Date of Patent: Mar. 28, 2006

(54) CONTROL METHOD FOR A VEHICLE HAVING AN ENGINE AND AN ACCESSORY DEVICE

(75) Inventors: Allan Joseph Kotwicki, Williamsburg, MI (US); George Blaha, Morgantown, WV (US); Gerhard A. Dage, Franklin, MI (US); John David Russell, Farmington Hills, MI (US); Michael John Cullen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/625,756

(22) Filed: Jul. 22, 2003

(65) Prior Publication Data

US 2004/0216473 A1 Nov. 4, 2004

Related U.S. Application Data

(60) Continuation of application No. 10/087,870, filed on Mar. 1, 2002, now Pat. No. 6,601,295, which is a division of application No. 09/482,447, filed on Jan. 13, 2000, now Pat. No. 6,755,032.

(51) Int. Cl.
*B60H 1/32* (2006.01)

(52) U.S. Cl. ............................ 62/133; 62/157; 62/230; 62/323.4; 62/243

(58) Field of Classification Search .................. 62/230, 62/133, 157, 158, 243, 226, 228.1, 323.1, 62/227, 323.4

See application file for complete search history.

(56) References Cited

U.S. PATENT DOCUMENTS

| | | | | |
|---|---|---|---|---|
| 3,434,028 | A | | 3/1969 | McCready |
| 4,155,225 | A | * | 5/1979 | Upchurch, Jr. ............. 62/323.1 |
| 4,206,613 | A | * | 6/1980 | Shockley .................. 62/323.1 |
| 4,305,258 | A | * | 12/1981 | Spencer, Jr. ................ 62/243 |
| 4,425,765 | A | | 1/1984 | Fukushima et al. |
| 4,492,195 | A | | 1/1985 | Takahashi et al. |
| 4,721,083 | A | | 1/1988 | Hosaka |
| 4,976,589 | A | | 12/1990 | Ide |
| 5,163,399 | A | | 11/1992 | Bolander et al. |
| 5,241,855 | A | | 9/1993 | Cullen et al. |
| 5,245,966 | A | | 9/1993 | Zhang et al. |
| 5,319,555 | A | | 6/1994 | Iwaki et al. |
| 5,415,004 | A | * | 5/1995 | Iizuka ......................... 62/158 |
| 5,507,153 | A | | 4/1996 | Seto et al. |
| 5,743,099 | A | | 4/1998 | Kraynack et al. |
| 5,752,387 | A | | 5/1998 | Inagaki et al. |
| 5,761,917 | A | | 6/1998 | Corcoran et al. |
| 5,826,208 | A | | 10/1998 | Kuroiwa et al. |
| 5,924,296 | A | | 7/1999 | Takano et al. |

FOREIGN PATENT DOCUMENTS

| | | |
|---|---|---|
| WO | 99 32838 | 7/1999 |

* cited by examiner

*Primary Examiner*—Harry B. Tanner
(74) *Attorney, Agent, or Firm*—Allan J. Lippa; Alleman Hall McCoy Russell & Tuttle LLP

(57) ABSTRACT

A method for controlling cycling of an air conditioning compressor coupled to an internal combustion engine interrupts normal cycling based on operation conditions. In addition, normal engaged and disengaged cycling durations are adaptively estimated in real-time. The method of the present invention achieves improved fuel economy and improved drive feel. As an example, improved fuel economy is achieved by engaging the compressor during braking or when the engine is being driven by the vehicle. As another example, improved drive feel is achieved by engaging the compressor during transient conditions when drive feel is unaffected.

9 Claims, 11 Drawing Sheets

CONTROL METHOD FOR A VEHICLE HAVING AN ENGINE AND AN ACCESSORY DEVICE

CROSS-REFERENCE TO RELATED APPLICATIONS

This application is a continuation application of Ser. No. 10/087,870 filed Mar. 1, 2002 now U.S. Pat. No. 6,601,295 which application is a divisional application of Ser. No. 09/482,447 filed Jan. 13, 2000 now U.S. Pat. No. 6,755,032, and are hereby incorporated in their entireties for all purposes.

FIELD OF THE INVENTION

The field of the invention relates generally to air conditioning system control coordinated with engine control.

BACKGROUND OF THE INVENTION

Vehicles are typically equipped with an air conditioning system to provide cabin cooling and to dry air for dehumidifying functions. Air conditioning systems typically include a compressor driven by a vehicle's internal combustion engine. The compressor can be either engaged, fully or partially, or disengaged to the engine via an electronically controlled clutch.

During air conditioning system operation under certain operating conditions, the compressor cycles between an engaged and disengaged state. Cycling is typically controlled based on refrigerant pressure in the air conditioning system. When the engine and clutch are coupled, pressure decreases and significantly cooled cabin air is circulated through the vehicle. Such operation continues until pressure reaches a minimum value where the clutch is controlled to disengage the engine and compressor. If air circulation is continued, pressure increases until it reaches a maximum value. At this maximum value, the compressor is then re-engaged via the clutch and cycling repeats.

It is also known to disengage the engine and compressor during vehicle launch conditions, thereby allowing more engine output. In this way, degraded vehicle launch performance is avoided, even when air conditioning is operational. Vehicle launch is determined based on vehicle speed, throttle position, and various other factors.

The inventors herein have recognized disadvantages with the above approaches. First, driver comfort is degraded during clutch engagements during some driving conditions. In other words, during some driving conditions, clutch engagements are felt strongly by vehicle operators and comfort is therefore degraded.

Second, optimum fuel economy is not obtained since compressor cycling engagement is not coordinated to vehicle and engine operating conditions. In other words, during some conditions, extra fuel is added to the engine to provide air conditioning while maintaining engine output at a desired level. During other conditions, no extra fuel is needed to provide air conditioning.

SUMMARY OF THE INVENTION

An object of the present invention is to provide methods for controlling engagements of an air conditioning compressor coupled to an internal combustion engine capable of improving fuel economy and/or improving drive feel.

The above object is achieved and disadvantages of prior approaches overcome by a control method for use with an internal combustion engine and an accessory device, the engine and device coupled to a vehicle, the method comprising: determining when the device is cycling between an engaged state where the engine is coupled to the device and a disengaged state where the engine is de-coupled from the device; and engaging the device based at least on an operating condition when the device is disengaged.

By engaging the device in response to an operating condition when the device is cycling between an engaged state and a disengaged, it is possible to coordinate cycling of the device with current driving conditions. In other words, rather than asynchronous operation between various control systems, the present invention provides a method to couple device cycling control to other conditions.

An advantage of the above aspect of the invention is that improved fuel economy is achieved.

Another advantage of the above aspect of the invention is that improved drive feel is achieved.

In another aspect of the invention, the above object is achieved and disadvantages of prior approaches overcome by a control method for use with an internal combustion engine and an air conditioning compressor, the engine and compressor coupled to a vehicle, the method comprising: indicating a transient vehicle driving condition while the vehicle moving; estimating a duration of a cycle in which the device is engaged and disengaged due to an air conditioning system parameter; and engaging the compressor in response to said indication when said duration is greater than a predetermined duration.

By coordinating engagement with a transient vehicle driving condition while the vehicle moving, it is possible to engage the compressor unbeknownst to the vehicle driver. Further, by performing engagement when a percentage disengaged duration is greater than a predetermined duration, it is possible to prevent excessive compressor cycling.

An advantage of the above aspect of the invention is that improved drive feel and improved customer satisfaction is achieved.

In yet another aspect of the invention, the above object is achieved and disadvantages of prior approaches overcome by an article of manufacture comprising a computer storage medium having a computer program encoded therein for use with an internal combustion engine and an air conditioning compressor, the engine and device coupled to a vehicle having brakes. The computer storage medium comprises code for determining when the compressor is cycling between an engaged state where the engine is coupled to the compressor and a disengaged state where the engine is de-coupled from the compressor, code for indicating when the brakes are actuated, code for estimating a percentage disengaged duration of a cycle in which the compressor is engaged and disengaged due to an air conditioning system parameter, and code engaging the compressor based at least on said indication when said percentage disengaged duration is greater than a predetermined value.

By engaging the compressor in response to brake actuation when a percentage disengaged duration is greater than a predetermined value, it is sometimes possible to operate the compressor without added fuel to the engine since kinetic energy from the vehicle can be used to power the compressor. In other words, this added coordination between compressor cycling control and vehicle braking conditions provides more opportunities to operate the compressor without excess fuel to the engine.

An advantage of the above aspect of the invention is that improved fuel economy is achieved.

Other objects, features and advantages of the present invention will be readily appreciated by the reader of this specification.

BRIEF DESCRIPTION OF THE DRAWINGS

The object and advantages of the invention claimed herein will be more readily understood by reading an example of an embodiment in which the invention is used to advantage with reference to the following drawings wherein:

DESCRIPTION OF THE INVENTION

Figure 1A:
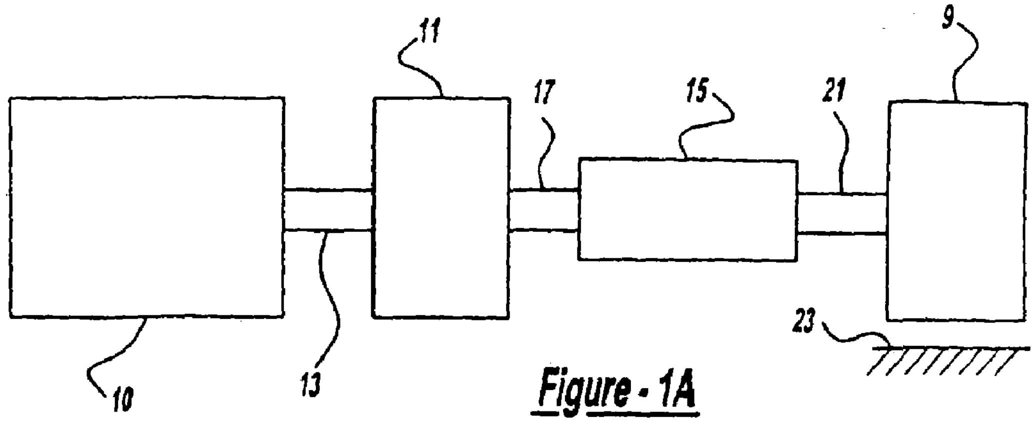
FIG. 1A is a block diagram of a vehicle illustrating various components related to the present invention.
Figure 1B:
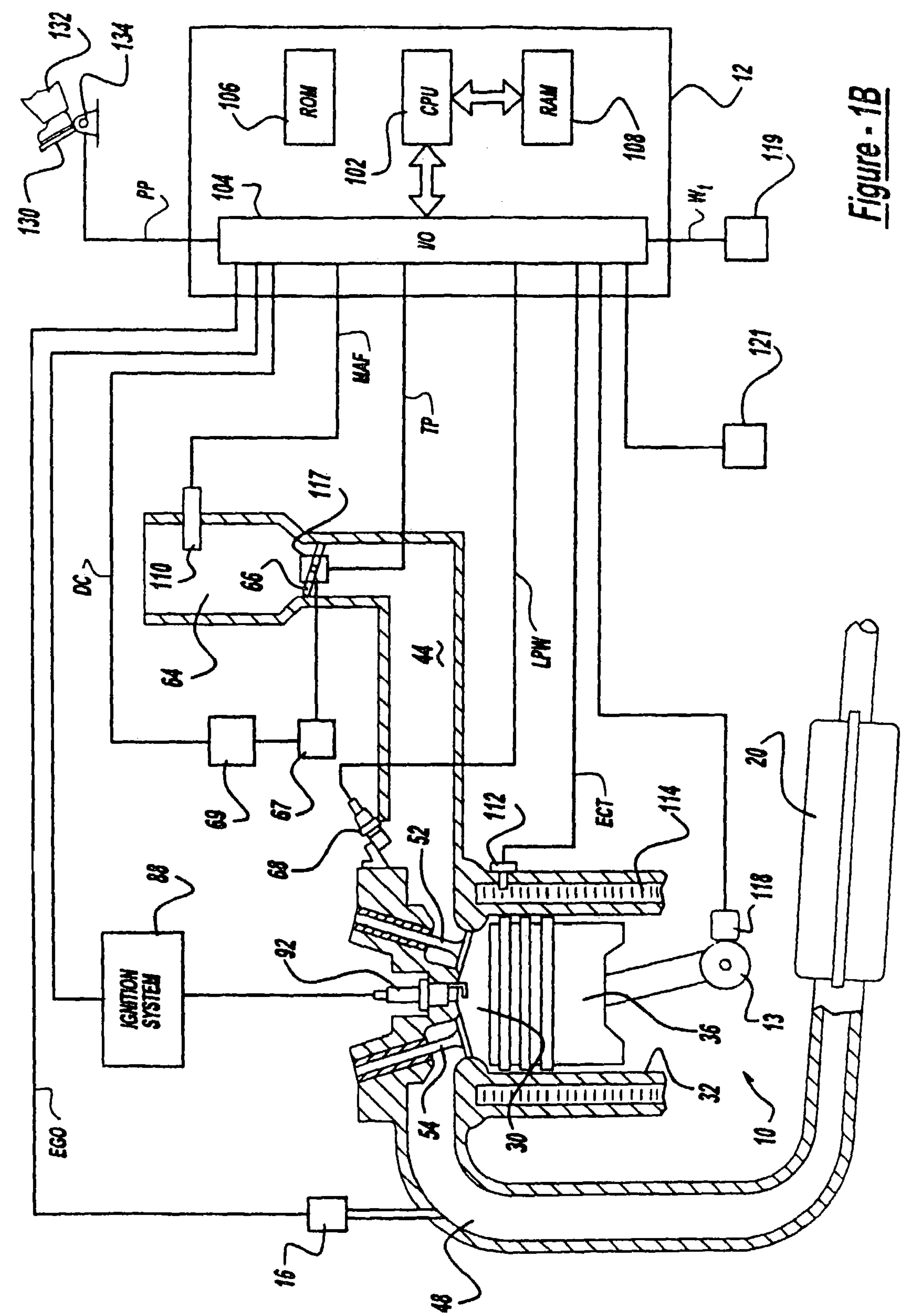
FIG. 1B is a block diagram of an engine in which the invention is used to advantage.

Referring to FIG. 1A, internal combustion engine 10, further described herein with particular reference to FIG. 1B, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or partially engaged, torque converter 11 is said to be in an unlocked state. Turbine shaft 17 is also known as transmission input shaft. Transmission 15 comprises an electronically controlled transmission with a plurality of selectable discrete gear ratios. Transmission 15 also comprises various other gears such as, for example, a final drive ratio (not shown). Transmission 15 is also coupled to tire 19 via axle 21. Tire 19 interfaces the vehicle (not shown) to the road 23.

Internal combustion engine 10 comprising a plurality of cylinders, one cylinder of which is shown in FIG. 1B, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (We). Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

In a preferred embodiment, controller 12 controls engine according to a torque based control system. In such a system, a desired wheel torque, or engine torque, is determined based on pedal position (PP). Then, position of throttle 66 is controlled so that actual wheel torque, or engine torque, approaches the desired engine torque. The system can be configured based on engine brake torque, which is the available torque at the engine output, taking into account torque losses.

Figure 2:
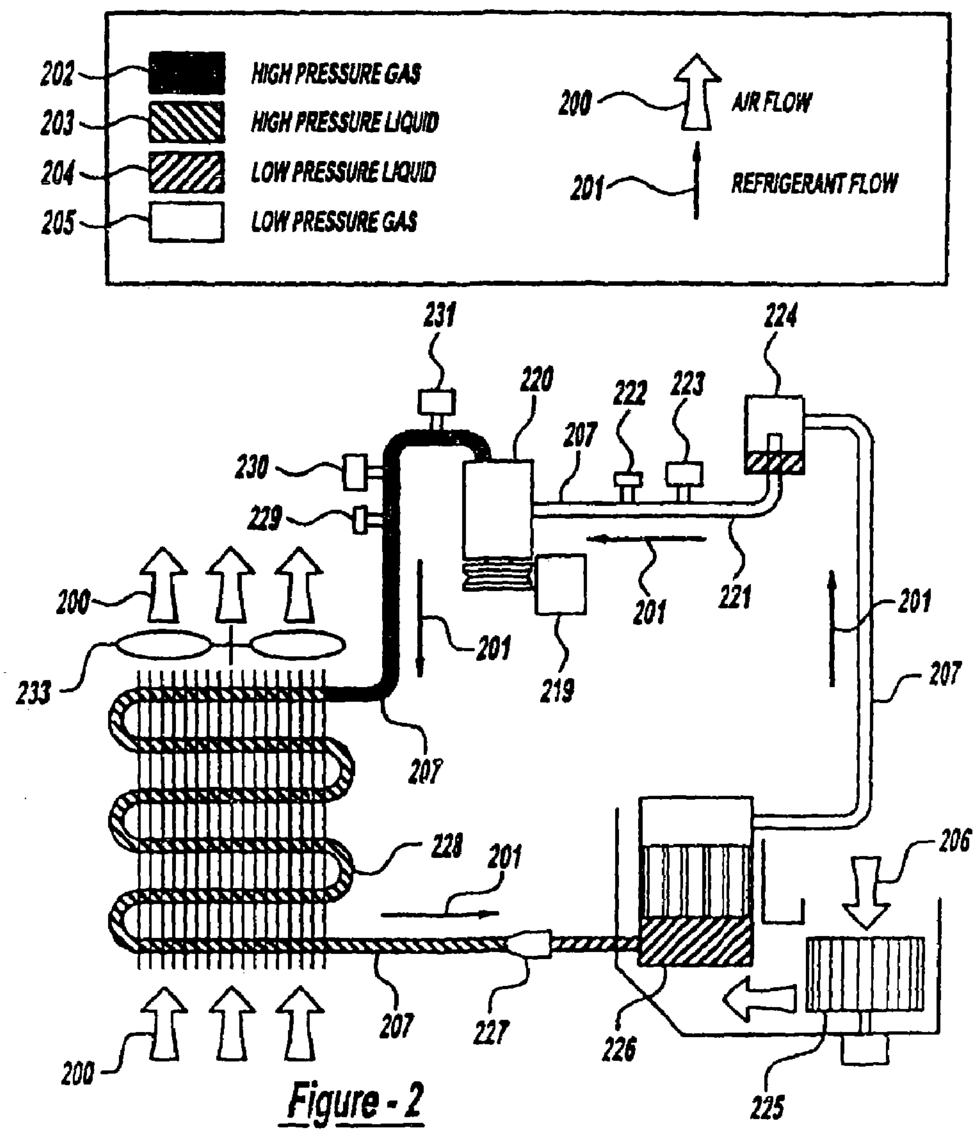
FIGS. 2–17 are block diagrams of embodiments in which the invention is used to advantage.

Referring now to FIG. 2, an air conditioning (A/C) system is shown. Arrows 201 indicate direction of refrigerant, or working fluid, flow. Arrows 200 indicate direction of air flow that is circulated through the engine compartment (not shown). Arrows 206 indicate direction of air flow that is circulated through the cabin (not shown). Solid shading 202 indicates working fluid is a high pressure gas, left handed cross-hatching 203 indicates working fluid is a high pressure liquid, right handed cross-hatching 204 indicates working fluid is a low pressure liquid, and no shading 205 indicates working fluid is a low pressure gas. Working fluid is circulated through the A/C system via line 207.

Compressor 220, which can be coupled to engine 10 via a clutch 219, is located between high pressure gas 202 and low pressure gas 205. Upstream of compressor 220 is low pressure service port 222 and A/C cycling pressure switch 223. Upstream of cycling switch 223 is suction accumulator/drier 224. Further upstream of suction accumulator/drier 224 is A/C evaporator core 226, which is coupled to blower motor 225. Continuing upstream of A/C evaporator core 226 is A/C evaporator orifice 227 and A/C condenser core 228, which is coupled to radiator fan 233. Upstream of A/C condenser core 228 is high pressure service port 229, compressor relief valve 230, and A/C pressure cut-off switch 231.

A description of an A/C thermodynamic process is now presented. Starting at compressor 220, low pressure gas 205 is compressed to high pressure gas 202, rising in temperature due to compression. Compressor relief valve 230 prevents high pressure gas 202 from reaching a maximum allowable high pressure gas pressure. A/C pressure cut-off switch 231 disengages compressor 200 from engine 10 via clutch 219.

High pressure gas 202 sheds heat to the atmosphere at A/C condenser core 228, changing phase to high pressure liquid 203 as it cools. At A/C evaporator orifice 227, high pressure liquid 204 expands to low pressure liquid 204. At A/C evaporator core 226 low pressure liquid 204 passes through a jet (not shown) and evaporates into low pressure gas 205. This action cools the working fluid, A/C evaporator core 226, and cabin airflow 206.

Low pressure liquid 204 continues to suction accumulator/drier 224 and A/C cycling pressure switch 223 A/C cycling pressure switch 223 signals to engage compressor 220 to engine 10 via clutch 219 when measured pressure is above a predetermined maximum pressure. A/C cycling pressure switch 223 also signals to disengage compressor 220 from engine 10 via clutch 219 when measured pressure is below a predetermined minimum pressure. These setpoint pressures are typically 45 psi and 24.5 psi, respectively. They are designed to keep A/C evaporator core 226 just above freezing. When compressor 220 cycles between engaged and disengaged due solely to A/C cycling pressure switch 223, it is referred to herein as normal, or uninterrupted, cycling. Stated another way, this normal/uninterrupted cycling is when the compressor cycles to control cabin temperature, or cooling air temperature, based on air conditioning parameters such as pressure or temperature. However, according to the present invention, engagement of compressor 220 is controlled due to various factors as described later herein.

Figure 3:
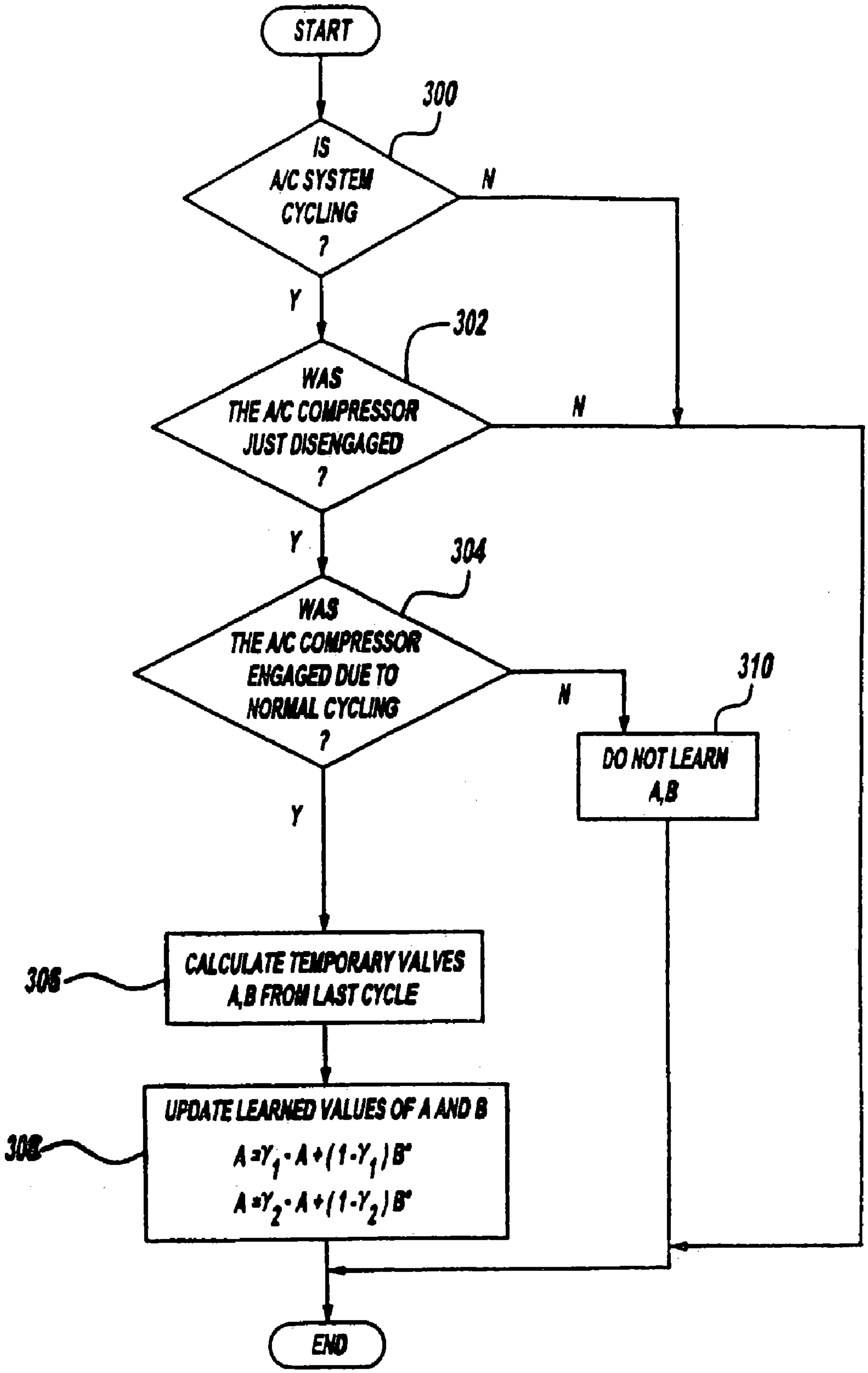

Referring to FIG. 3, a routine is shown for learning the on and off duration of A/C compressor 201. First, in step 300, a determination is made as to whether the A/C system is presently cycling. In other words, engagement due to engine operating conditions is not enabled unless compressor 201 has cycled a predetermined number of times. When the answer to step 300 is YES, the routine continues to step 302. In step 302, a determination is made as to whether A/C compressor 201 has just disengaged. In other words, a determination is made as to whether A/C compressor 201 has just been disconnected from engine 10. When the answer to step 302 is YES, a determination is made in step 304 as to whether the A/C compressor was engaged due to normal cycling. In other words, a determination is made as to why the compressor was previously engaged. If it was engaged due to normal cycling, which means pressure measured by sensor 223 was greater than a predetermined value, then the routine continues to step 306. Stated another way, if an uninterrupted cycle was completed, it is possible to learn normal on and off durations. In step 306, the routine calculates temporary values A' and B' from the previous cycle. Value A' represents the duration that A/C compressor 201 was engaged and B' represents the duration A/C compressor 201 was disengaged. In other words, A' and B' respectively represent on and off durations for normal cycling under present operating conditions. Next, in step 308, the learned values A and B are updated based on the calculated temporary values A' and B' using filter coefficients $\gamma$1 and $\gamma$2. In other words, the learned on and off durations are filtered to remove measurement noise. When the answer to step 304 is NO, the routine continues to step 310, where values A and B are not updated. In addition, if compressor 201 was disengaged due to vehicle launch conditions, the routine continues to step 310. In this way, it is possible to learn the on and off durations of uninterrupted (or normal) A/C compressor cycling with the present conditions. In other words, the on and off durations are adaptively learned for normal (uninterrupted) A/C operation.

In an alternative embodiment, values A and B are learned as a function of air conditioning operating conditions such as, for example, blower speed, desired cabin temperature, desired cooling level, ambient temperature, cabin humidity, and/or ambient humidity. By including variation in these air conditioning operating conditions, values A and B for current operating conditions can be used to include an open loop estimate to account for quickly changing driver requests or quickly changing ambient conditions.

Figure 4A:
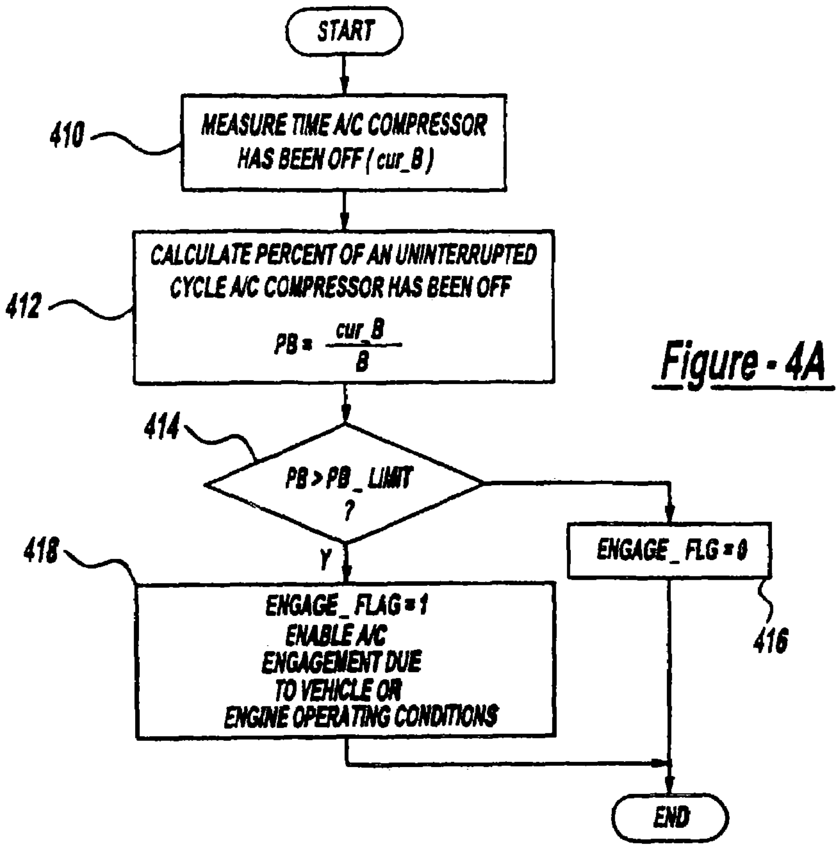

Referring now to FIG. 4A, a routine is described for determining whether normal A/C cycling can be interrupted to engage A/C compressor 201. First, in step 410, the time A/C compressor 201 has been off, or the time since A/C compressor 201 was last disengaged, is measured (cur_b). Next, in step 412, the percent of an uninterrupted cycle in which the A/C compressor has been off, is calculated. In other words, the routine calculates the percent of an uninterrupted cycle that A/C compressor 201 has been off (pb) at the present calculation point. This value is calculated based on the time measured in step 410 (cur_b) and the learned off-time (B). Next, in step 414, a determination is made as to whether the value pb is greater than a limit value (pb_limit). Stated another way, engagement due to operating conditions is prevented until compressor 201 has been disengaged for a predetermined duration. In this particular example, the duration is a relative percentage of the presently estimated off duration (B). This prevents excessive cycling. For example, if compressor 201 is engaged right after it was disengaged, it will again be disengaged since measured pressure will quickly reach the maximum limit value. When the answer to step 414 is NO, an engagement flag (engage_flg) is set equal to zero in step 416. Otherwise, in step 418, an engagement flag is set equal to 1. In other words, in step 418, the routine enables A/C engagement due to various conditions described later herein.

In an alternative embodiment of the present invention, step 414 can be modified to determine whether time measured in step 410 (cur_b) is greater than a predetermined limit time (cur_b_limit). Those skilled in the art will recognize various other methods to prevent excessive cycling such as determining if compressor 201 has been off for a predetermined number of engine rotations.

Figure 4B:
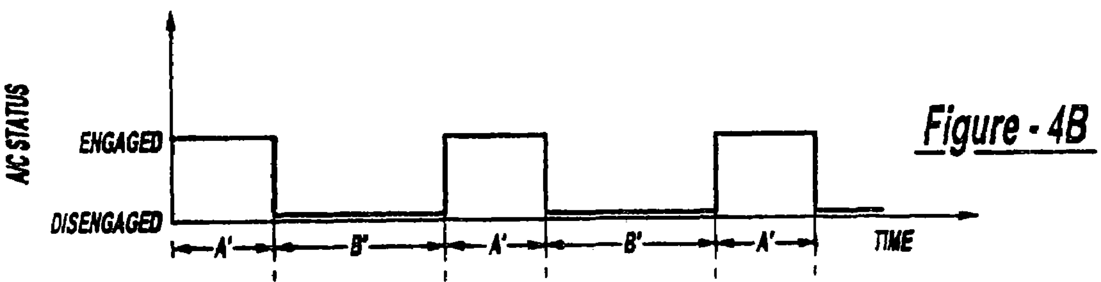
Figure 4C:
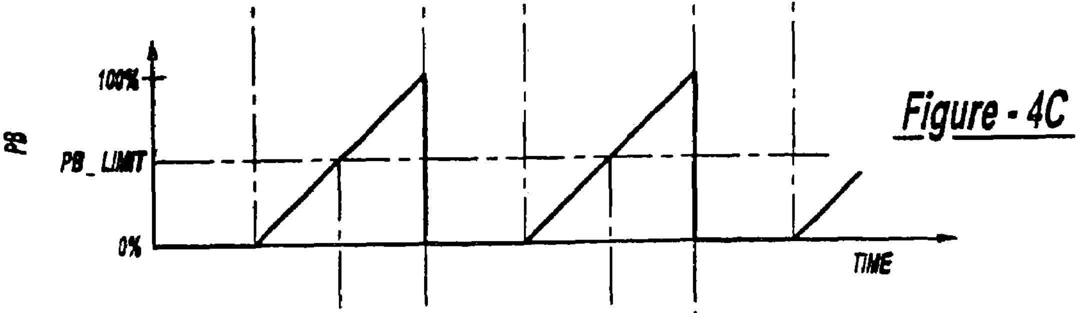
Figure 4D:
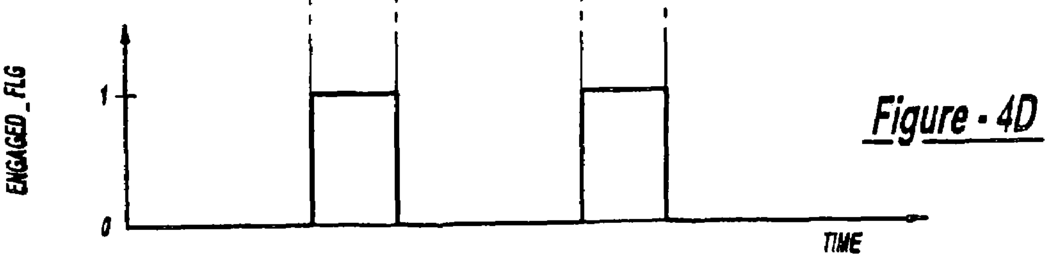

Referring now to FIGS. 4B–4D, several graphs show an example of operation according to the present invention. FIG. 4B shows whether A/C compressor 201 is engaged or disengaged as well as on and off durations A' and B', respectively. FIG. 4C shows the corresponding percent of an uninterrupted cycle that A/C compressor 201 has been off (pb). Also, limit value (pb_limit) is shown by a dash dot line. FIG. 4D shows corresponding engagement flag (engage_flg). According to the present invention as described with particular reference to FIG. 4A, when pb is greater than pb_limit, engage_flg is set equal to one. Otherwise, engage_flg is set equal to zero.

The A/C compressor cycling of the present invention is controlled by various parameters. Uninterrupted A/C compressor cycling, as defined herein, represents when the A/C compressor is cycled on and off based on pressure measured by A/C cycling pressure switch 203. This uninterrupted cycling is also referred to herein as normal cycling. In this normal cycling, the A/C compressor engages and disengages so that the driver is provided with requested cooling. Further, in this normal cycling, the A/C compressor is engaged when the A/C cycling pressure switch 203 measures a pressure greater than a first predetermined value. The A/C compressor stays on until the A/C cycling pressure switch 203 measures a pressure less than a second value. At this point, the A/C compressor is disengaged. The A/C compressor remains disengaged until, once again, A/C cycling pressure switch 203 measures a pressure greater than the first value. In this way, the A/C cycles normally on and off based on environmental conditions and driver requests.

According to the present invention, engagement of the A/C compressor is also performed under various other conditions. These conditions can be transient vehicle operating conditions; conditions where the A/C compressor can be driven with minimal fuel economy impact; and conditions where the potential for minimum drive impact during the engagement is possible. The following figures describe such operation.

Figure 5:
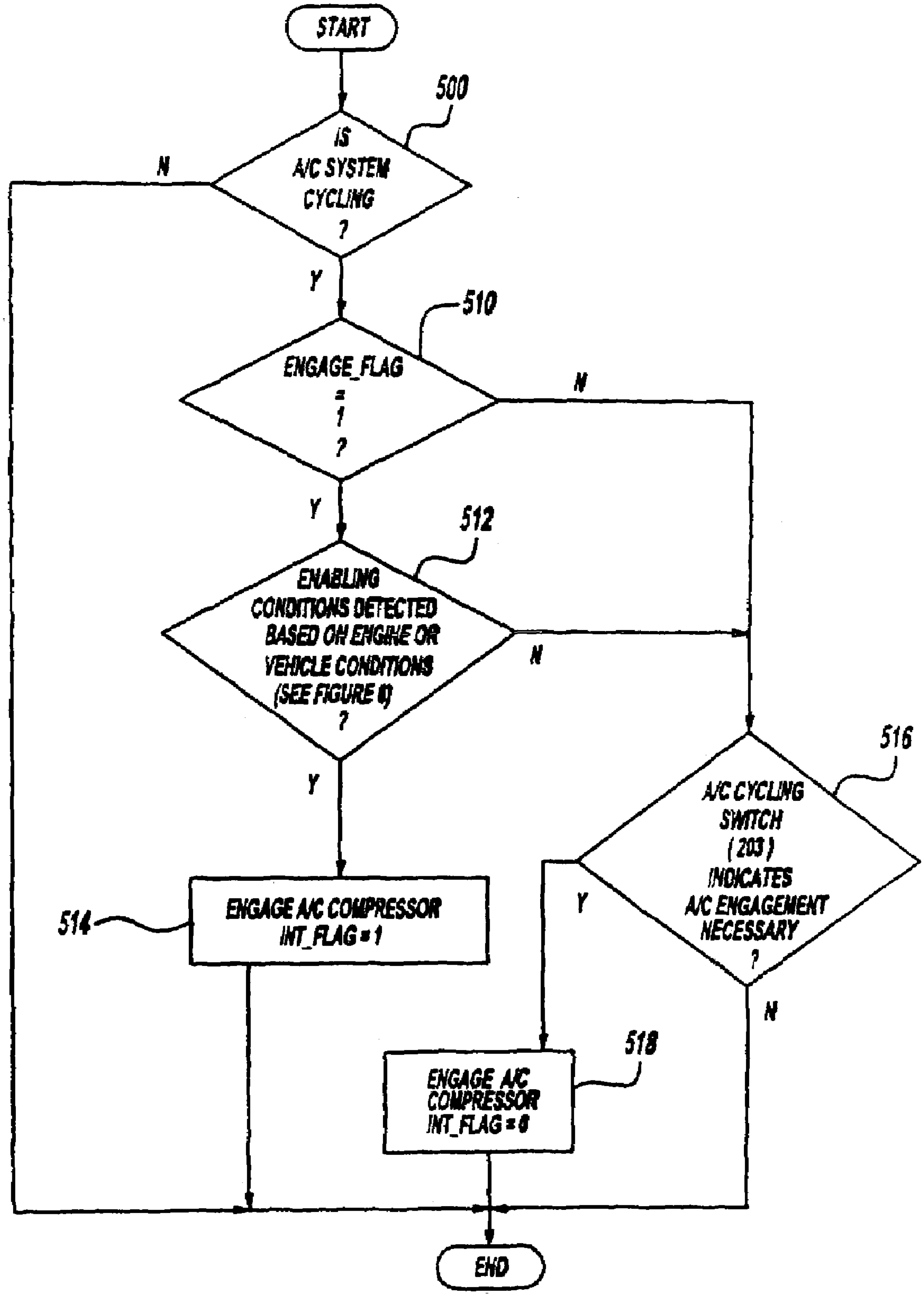

Referring now to FIG. 5, a routine is described for determining whether to engage the A/C compressor. First, in step 500, a determination is made as to whether the A/C system is presently cycling. In other words, engagement due to engine operating conditions is not enabled unless compressor 201 has cycled a predetermined number of times. When the answer to step 500 is YES, in step 510, a determination is made as to whether the engagement flag (engage_flg) is set equal to 1. When the answer to step 510 is YES, a determination is made in step 512 as to whether enabling conditions have been detected based on engine or vehicle conditions (see FIG. 6). When the answer to step 512 is YES, the A/C compressor is engaged in step 514 and interrupt flag (int_flag) is set equal to 1.

When the answer to step 510 is NO, a determination is made in step 516 as to whether A/C cycling pressure switch 203 indicates that A/C engagement is necessary. When the answer to step 516 is YES, in step 518 the A/C compressor is engaged, interrupt flag (int_flag) is set equal to zero, and normal cycling will follow.

Figure 6:
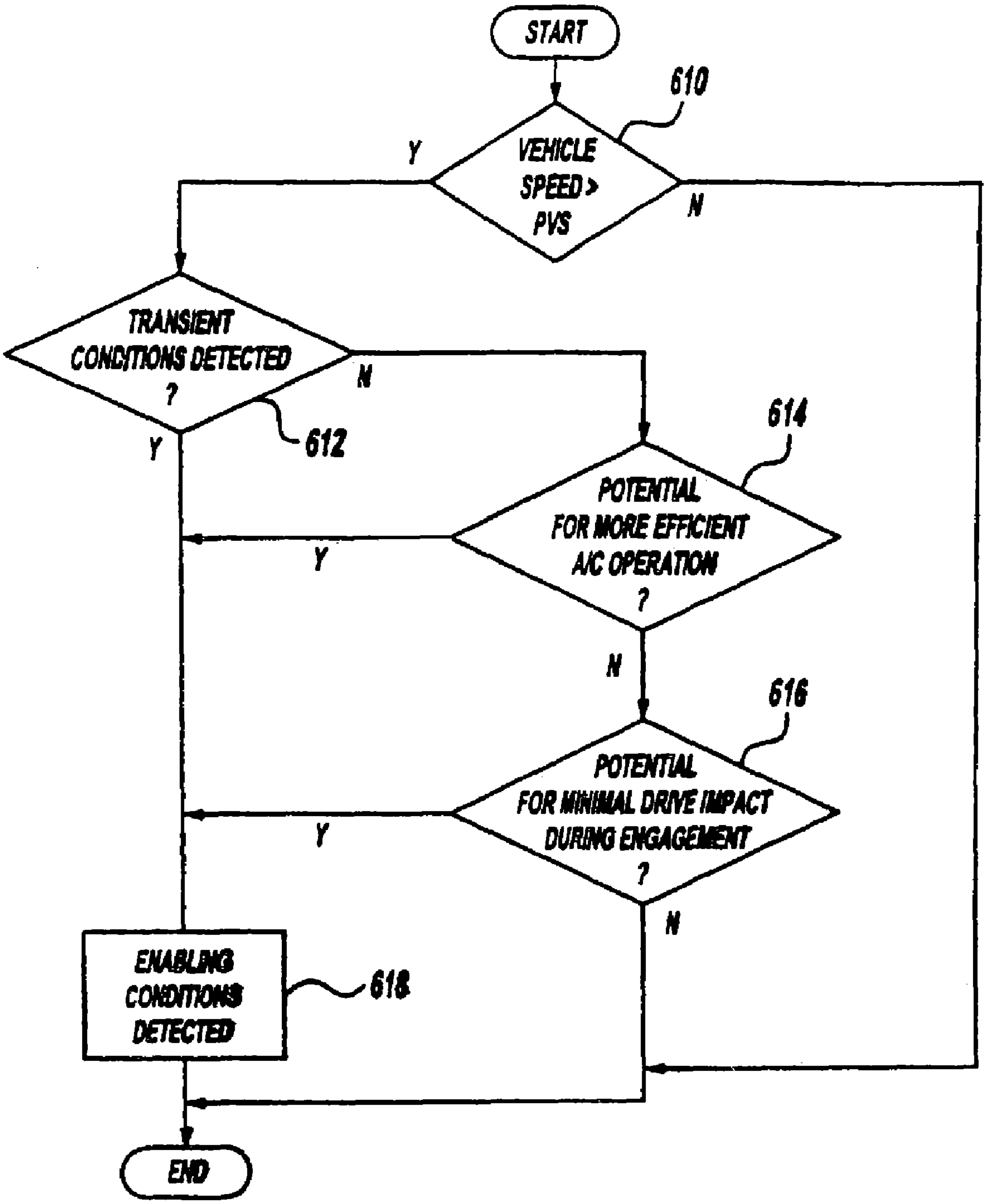

Referring now to FIG. 6, a routine is described for determining whether enabling conditions have been detected. First, in step 610, it is determined whether vehicle speed is greater than vehicle speed threshold (pvs). When the answer to step 610 is YES, a determination is made as to whether transient conditions have been detected in step 612. The detection of transient conditions is described later herein. When the answer to step 612 is NO, a determination is made in step 614 as to whether there is a potential for more efficient A/C operation. Determining whether more efficient A/C operation is possible is described later herein. When the answer to step 614 is NO, a determination is made in step 616 as to whether there is a potential for minimum drive impact during engagement. When the answer to either step 612, 614 or 616 is YES, the routine indicates in step 618 that enabling conditions have been detected.

Other conditions can also be used in determining whether to enable engagement according to the present invention. For example, during high ambient temperatures, cycling is minimal. Stated another way, if compressor 220 if cycled off only for less than a minimal off time, enabling conditions would not be detected.

Figure 7:
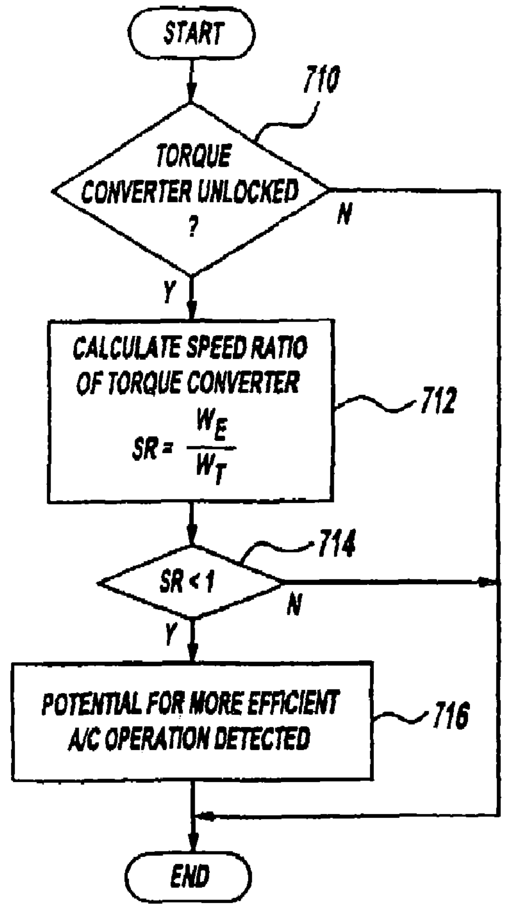

Referring now to FIG. 7, a routine is described for determining whether potential for more efficient A/C operation has been detected. First, in step 710, a determination is made as to whether torque converter 11 is unlocked. When the answer to step 710 is YES, a speed ratio (sr) is calculated across torque converter 11 based on engine speed (We) and turbine speed (Wt). Next, in step 714, a determination is made as to whether the calculated speed ratio is less than 1. When the answer to step 714 is YES, the routine indicates in step 716 that there is a potential for more efficient A/C operation. In other words, when torque converter speed ratio is less than 1, the engine is absorbing torque, or engine brake torque is less than zero, and therefore it is possible to engage the A/C compressor and use the force transmitted from the road through the engine powertrain to power the A/C compressor. In this way, less fuel is used since the A/C compressor is not being powered by engine combustion. Stated another way, excess fuel does not need to be added to the engine to power the A/C compressor when the engine is producing negative engine brake torque, i.e., when the engine is being driven.

Figure 8:
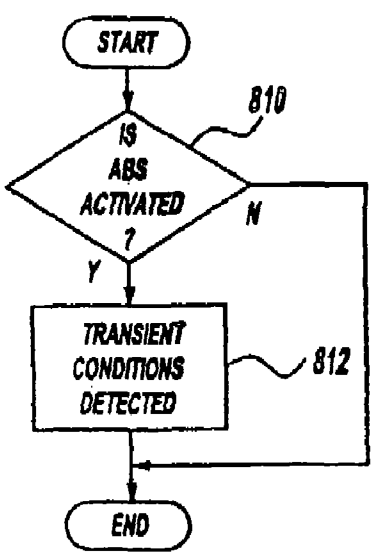

Referring now to FIG. 8, a routine is described for detecting transient conditions. First, in step 810, a determination is made as to whether an antilock braking system is activated. When the answer to step 810 is YES, the routine indicates in step 812 that transient conditions have been detected In other words, when antilock braking systems are activated the hydraulic pulsing that applies the hydraulic brake actuator interrupts normal drive feel experienced by the vehicle operator. Therefore, if the A/C compressor is engaged while the antilock braking system is activated, the driver will not notice the A/C engagement In this way, the A/C compressor can be engaged less often during normal drive situations where the driver may feel the A/C compressor engagement. Thus, drive feel is improved.

Figure 9:
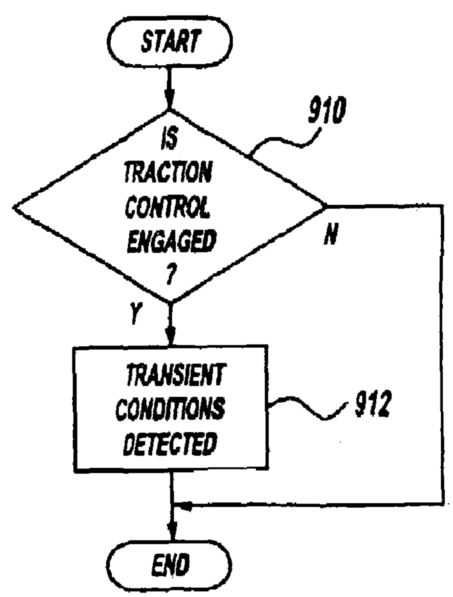

Referring now to FIG. 9, a routine is described for detecting transient conditions. First, in step 910, a determination is made as to whether traction control is engaged. When the answer to step 910 is YES, the routine indicates in step 912 that transient conditions have been detected. In other words, when traction control systems are activated, application of brakes and/or reduction in engine torque interrupts the normal drive feeling experienced by the vehicle operator. Therefore, if the A/C compressor is engaged while the traction control system is activated, the driver will not notice the A/C engagement. In this way, the A/C compressor can be engaged less often during normal drive situations where the driver may feel the A/C compressor engagement. Thus, drive feel is improved.

Figure 10:
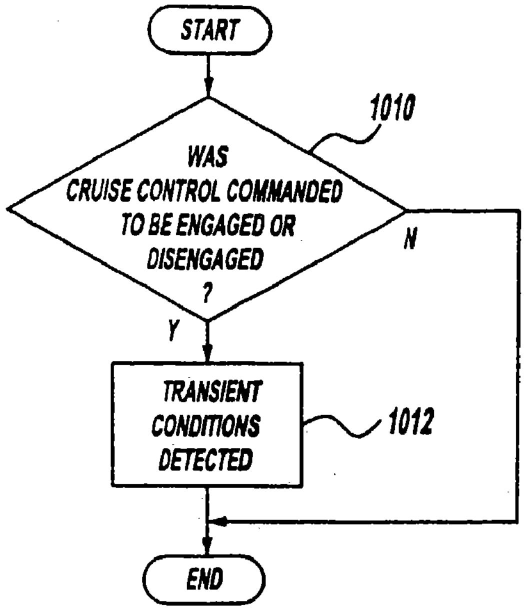

Referring now to FIG. 10, a routine is described for detecting transient conditions. First, in step 1010, a determination is made as to whether cruise control was commanded to be engaged or disengaged. When the answer to step 1010 is YES, the routine indicates in step 1012 that transient conditions have been detected. In other words, when cruise control is activated or deactivated, the change in control from the driver to the automatic control system or from the automatic control system to the driver can interrupt normal drive feel experienced by the vehicle operator. Therefore, if the A/C compressor is engaged concurrently with engagement or disengagement of the cruise control system, the driver will not notice the A/C engagement. In this way, the A/C compressor can be engaged less often during normal drive situations where the driver may feel the A/C compressor engagement. Thus, drive feel is improved.

Figure 11:
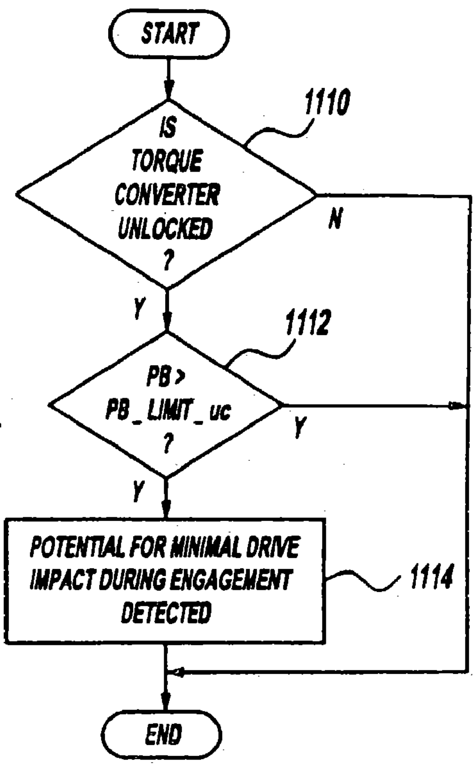

Referring now to FIG. 11, a routine is described for detecting potential for minimum drive impact during engagement. First, in step 1110, a determination is made as to whether torque converter 11 is unlocked. When the answer to step 1110 is YES, the routine continues to step 1112, where a determination is made as to whether the percent off-time (pb) is greater than limit value (pb_limit_uc). When the answer to step 1112 is YES, the routine indicates in step 1114 that the potential for minimum drive impact during engagement has been detected. In other words, it is less likely that a vehicle operator will feel A/C compressor engagements when torque converter 11 is unlocked since additional damping is provided by an unlocked torque converter. Thus, if the A/C compressor has been disengaged for greater than limit value (pb_limit_uc), improved drive feel can be achieved by taking advantage of the current situation and engaging the A/C compressor, rather than waiting until the A/C cycling pressure switch 203 indicates that the A/C compressor should be engaged due to measured pressure.

Figure 12:
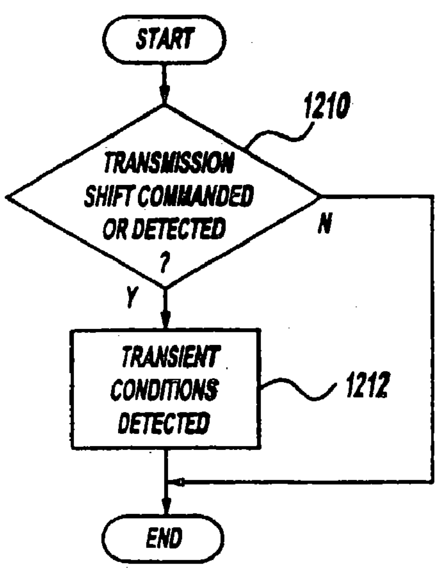

Referring now to FIG. 12, a routine is described for detecting transient conditions. First, in step 1210, a determination is made as to whether a transmission shift has been commanded or detected. When the answer to step 1210 is YES, the routine indicates in step 1212 that transient conditions have been detected. In other words, during a transmission shift vehicle acceleration or deceleration can occur, interrupting normal drive feel experienced by the vehicle operator. Therefore, if the A/C compressor is engaged during a transmission shift, the driver will not notice the A/C engagement since the driver expects vehicle feel to change. In this way, the A/C compressor can be engaged less often during normal drive situations where the driver may feel the A/C compressor engagement. Thus, drive feel is improved.

Figure 13:
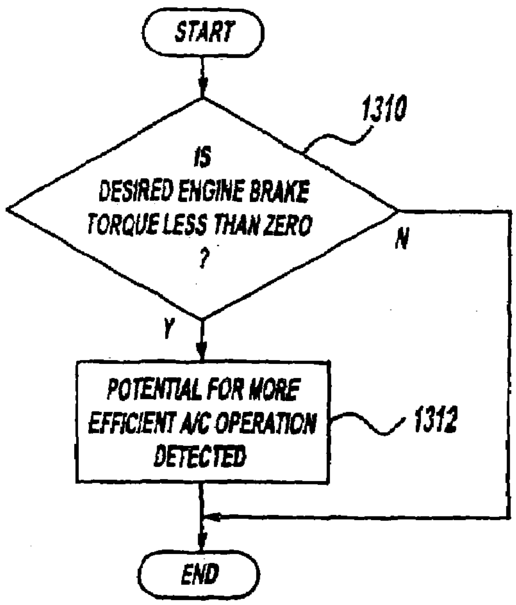

Referring now to FIG. 13, a routine is described for detecting the potential for minimum drive impact during engagement. First, in step 1310, a determination is made as to whether desired engine brake torque is less than zero. For example, to control vehicle speed to a desired vehicle speed during cruise control on a steep downgrade, it may be necessary to provide engine braking. Alternatively, if vehicle acceleration is controlled to a desired acceleration, negative engine brake torque may be requested When the answer to step 1310 is YES, the routine indicates in step 1312 that potential for more efficient A/C operation is detected. In other words, when engine 10 is absorbing torque, it is possible to engage the A/C compressor and use force transmitted from the road through the engine powertrain to power the A/C compressor. In this way, less fuel is used since the A/C compressor is not being powered by engine combustion. Stated another way, excess fuel does not need to be added to the engine to power the A/C compressor when the engine is producing negative engine brake torque.

In an alternative embodiment, potential for more efficient A/C operation can be determined directly from a desired vehicle acceleration. For example, if desired vehicle acceleration (which can be determined based on pedal position (PP)) is negative, or is less than a predetermined acceleration, potential for more efficient A/C operation can be indicated.

Figure 14:
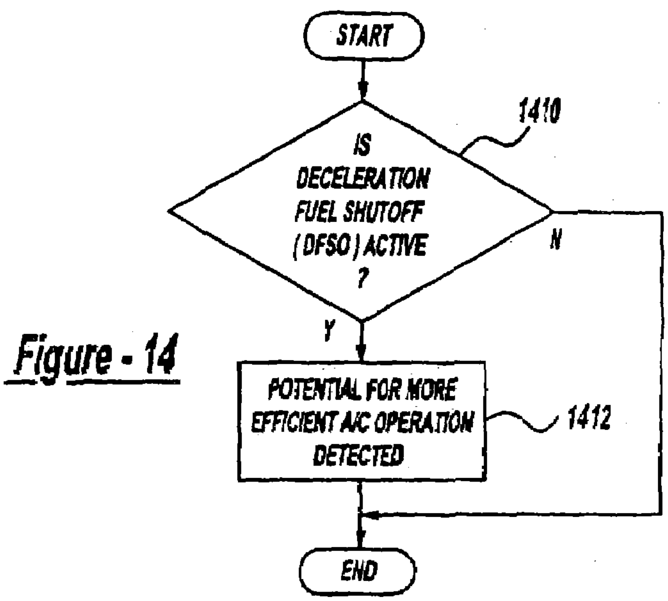

Referring now to FIG. 14, a routine is described for detecting the potential for minimum drive impact during engagement. First, in step 1410, a determination is made as to whether deceleration fuel shut-off (DFSO), or partial cylinder deactivation, is active (or requested). For example, to control vehicle speed to a desired vehicle speed during cruise control on a steep downgrade, it may be necessary to provide significant engine braking to a point where combustion in some engine cylinders is terminated. When the answer to step 1410 is YES, the routine indicates in step 1412 that potential for more efficient A/C operation is detected. In other words, when engine 10 is absorbing torque, it is possible to engage the A/C compressor and use force transmitted from the road through the engine powertrain to power the A/C compressor. In this way, less fuel is used since the A/C compressor is not being powered by engine combustion. Stated another way, excess fuel does not need to be added to the engine to power the A/C compressor when the engine is producing negative engine brake torque.

Figure 15:
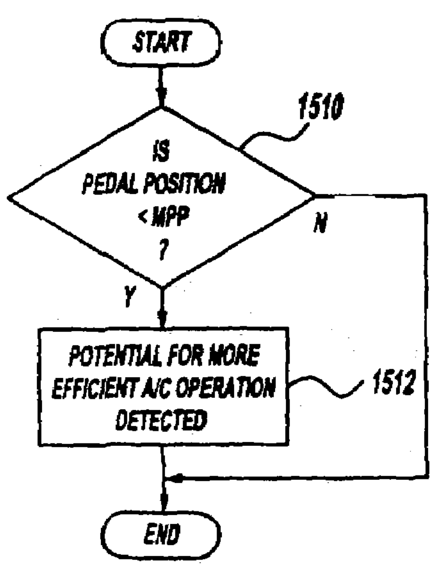

Referring now to FIG. 15, a routine is described for detecting more efficient A/C operation. First, in step 1510, a determination is made as to whether pedal position (PP) is less than minimum pedal position (MPP). In other words, if the driver has tipped-out, this can be viewed as a request for some deceleration and reduced engine torque. One method for reducing engine torque in an efficient manner is to engage the A/C compressor. Thus, when the answer to step 1510 is YES, the routine indicates in step 1512 that potential for more efficient A/C operation is detected. In other words, when engine 10 is absorbing torque to decelerate, it is possible to engage the A/C compressor and use the deceleration force to power the A/C compressor. In this way, less fuel is used since the A/C compressor is not being powered by engine combustion.

Figure 16:
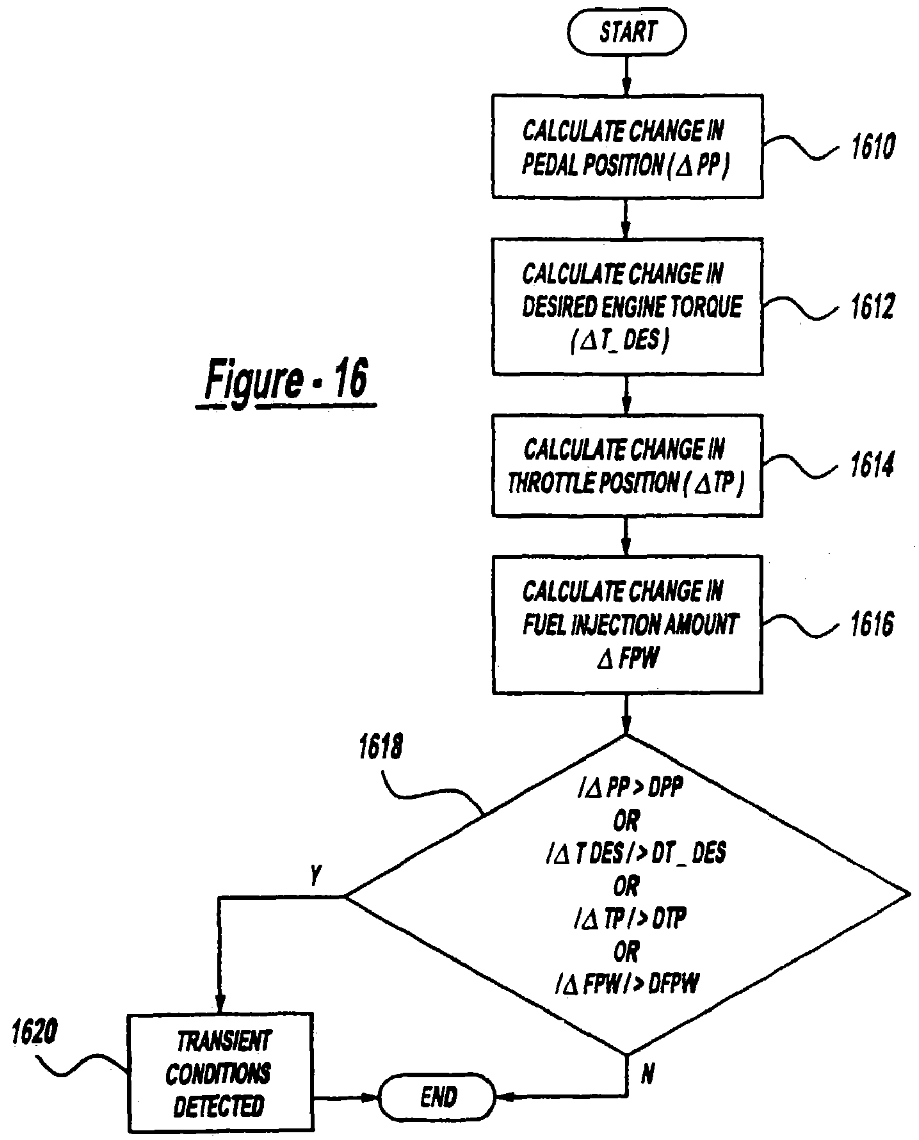

Referring now to FIG. 16, a routine is described for detecting transient conditions. First, in step 1610, a change in pedal position (Δpp) is calculated. In step 1612, a change in desired engine torque (ΔT_des) is calculated. Next, in step 1614, a change in throttle position (ΔTp) is calculated. Next, in step 1616, a change in fuel injection amount (Δfpw) is calculated. In step 1618, a determination is made as to whether the absolute value of any of these changes is greater than corresponding threshold values. When the answer to step 1618 is YES, the routine continues to step 1620 where the routine indicates that transient conditions have been detected. In this way, when the vehicle operator makes a change in power or torque delivered by engine 10, the A/C compressor can be engaged. Also, in this way, it is possible to mask engagement of the A/C compressor, since the driver will be expecting a significant change in vehicle operation.

Figure 17:
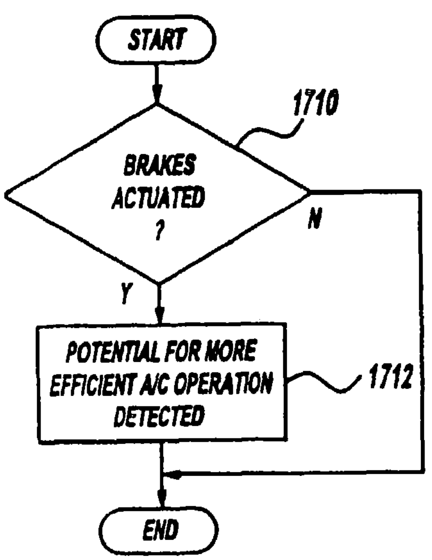

Referring now to FIG. 17, a routine is described for detecting the potential for more efficient A/C operation. First, in step. 1710, a determination is made as to whether vehicle brakes are actuated, for example by detecting whether the driver pressed a brake pedal. In other words, if the driver has applied the brakes this can be viewed as a request for some deceleration and reduced engine torque. One method for reducing engine torque in an efficient manner is to engage the A/C compressor. Thus, when the answer to step 1710 is YES, the routine indicates in step 1712 that potential for more efficient A/C operation is detected. In other words, when engine 10 is absorbing torque to decelerate, it is possible to engage the A/C compressor and use the deceleration force to power the A/C compressor. In this way, less fuel is used since the A/C compressor is not being powered by engine combustion.

Figure 18:
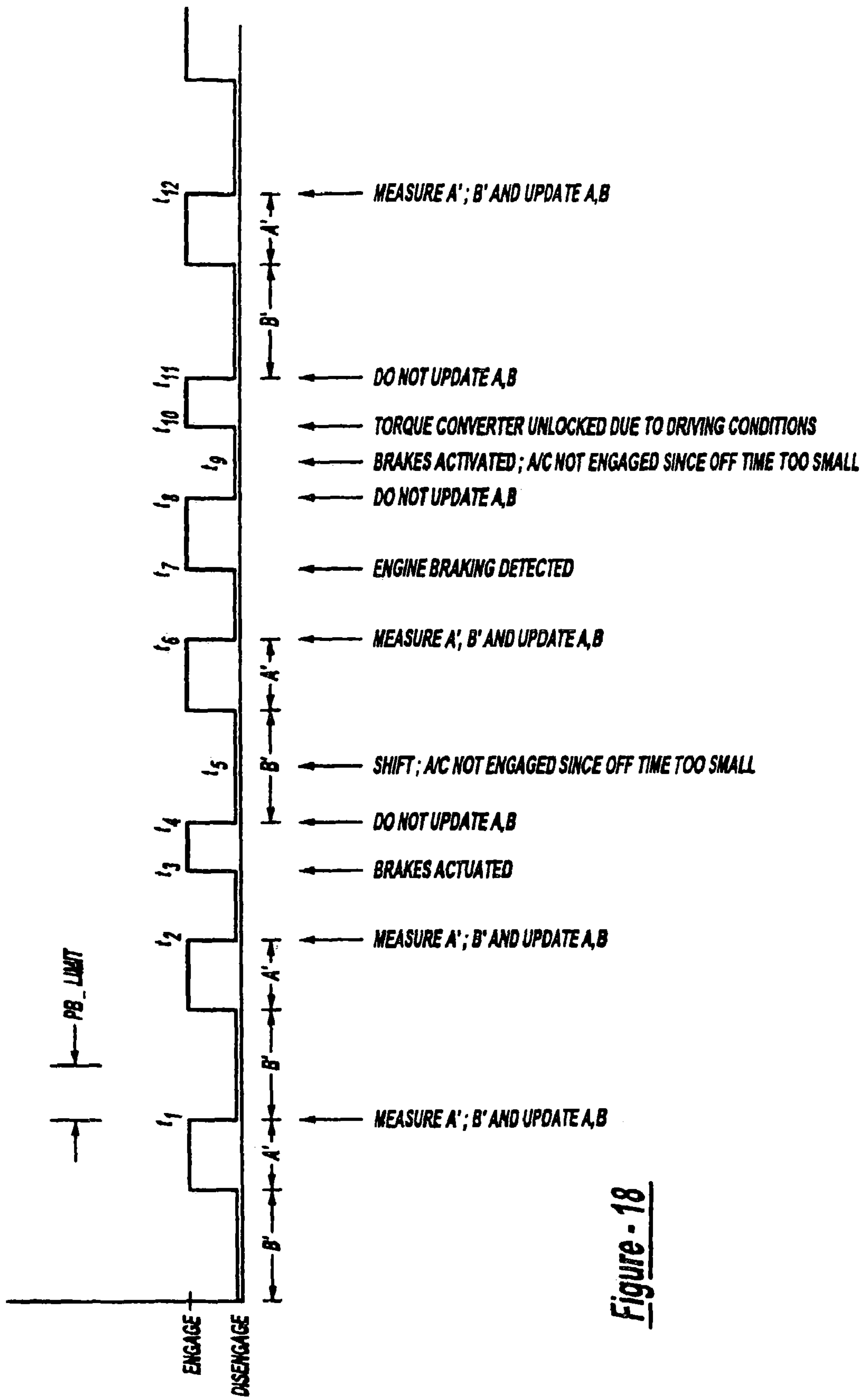
FIG. 18 is a graph showing an example of operation according to several aspects of the invention.

Referring now to FIG. 18, a graph depicting operation according to the present invention is shown. The graph shows whether the A/C compressor is engaged or disengaged. The graph starts at time t0 where the A/C compressor is disengaged. The compressor is then engaged after duration B' and remains engaged for duration A'. At time t1, the A/C compressor is disengaged. At time t1, the routine is able to measure values A' and B' and update values A and B, since the normal A/C cycling occurred and was not interrupted. At time t2, another uninterrupted A/C compressor cycle is completed, and again values A' and B' are measured and values A and B updated. At time t3, the vehicle brakes are applied. At time t3, since the percent of an uninterrupted A/C compressor cycle (pb) is greater than the limit value (pb_limit), the A/C compressor is engaged. At time t4, the A/C compressor is disengaged due to pressure measured by A/C cycling pressure switch 203. At time t4, the parameters A and B are not updated since the value of A' and B' cannot be measured since a normal cycle was not completed. At time t5, a vehicle gear shift is performed. At time t5, the A/C compressor is not engaged since the off time (pb) is too small. At time t6, another uninterrupted A/C compressor cycle has been completed and the values A' and B' can be measured so the values A and B can be updated. At time t7, engine braking is detected and the A/C compressor is engaged since the off time (pb) is greater than the limit value (pb_limit). At time t8, the A/C compressor is disengaged based on the pressure measured by A/C cycling pressure switch 203. At time t9, the brakes are actuated. However, the A/C compressor is not engaged since the off time is too small. At time t10, torque converter 11 is unlocked due to vehicle driving conditions. At time t10, the A/C compressor is engaged since the off time (pb) is greater than the limit value (pb_limit) and greater than torque converter unlocked limit value (pb_limit_uc). At time t11, the A/C compressor is disengaged due to pressure measured by A/C cycling pressure switch 203. Parameter A' and B' are not measured at time t11 nor are parameters A and B updated. Next, at time t12, another uninterrupted A/C compressor cycle has been completed and values A' and B' can be measured so that values A and B can be updated.

The graph in FIG. 18 shows an example of operation in which a portion of the conditions which can cause the A/C compressor to be engaged are described.

Although several examples of embodiments which practice the invention have been described herein, there are numerous other examples which could also be described. For example, the invention can also be used with direct injection engines wherein fuel is injected directly into the engine cylinder. Also, the invention is applicable with various types of accessory devices that can cycle between an engaged state and a disengaged state. In another example, potential for minimum drive impact can also be indicated when a clutch is depressed (or disengaged) in a manual transmission vehicle. During such a condition, it is may be possible to engage compressor 220 without affecting drive feel since engine 10 is not coupled to the wheels or transmission of the vehicle. The invention is therefore to be defined only in accordance with the following claims.

We claim:

1. A control method for use with an internal combustion engine and an accessory device, the engine and device coupled to a vehicle, the method comprising:

determining when the device is cycling between an engaged state where the engine is coupled to the device and a disengaged state where the engine is de-coupled from the device;

engaging the device based at least on an operating condition when the device is disengaged; and wherein said engine operating condition is when a speed ratio across a torque converter coupled to the engine is less than 1.

2. The method recited in claim 1, wherein said engaging comprises engaging the device based at least on said operating condition when the device is disengaged greater than a predetermined duration; and wherein said operating condition is a vehicle operating condition.

3. The method recited in claim 2, wherein said vehicle operating condition is when brakes coupled to the vehicle are activated.

4. The method recited in claim 2, wherein said vehicle operating condition is when an antilock braking system coupled to the vehicle is activated.

5. The method recited in claim 2, wherein said vehicle operating condition is when traction control is active.

6. A control method for use with an internal combustion engine coupled to a torque converter and an air conditioning compressor, the engine and compressor coupled to a vehicle, the method comprising:

indicating when the compressor can be engaged with minimal driver perception based on operating conditions; and engaging the compressor in response to said indication when the compressor is disengaged greater than a predetermined value and when the torque converter is unlocked.

7. The method recited in claim 6, wherein said predetermined duration is a percentage of a disengaged duration of a cycle in which the compressor is engaged and disengaged due to an air conditioning system parameter.

8. The method recited in claim 6, wherein said predetermined duration is a predetermined time.

9. The method recited in claim 6, wherein said predetermined duration is a predetermined percentage of normal compressor duty cycle.

* * * * *